US010169676B2

(12) United States Patent
Hou et al.

(10) Patent No.: US 10,169,676 B2
(45) Date of Patent: Jan. 1, 2019

(54) SHAPE-BASED REGISTRATION FOR NON-RIGID OBJECTS WITH LARGE HOLES

(71) Applicant: VanGogh Imaging, Inc., McLean, VA (US)

(72) Inventors: Xin Hou, Herndon, VA (US); Yasmin Jahir, McLean, VA (US); Jun Yin, McLean, VA (US)

(73) Assignee: VanGogh Imaging, Inc., McLean, VA (US)

( * ) Notice: Subject to any disclaimer, the term of this patent is extended or adjusted under 35 U.S.C. 154(b) by 118 days.

(21) Appl. No.: 15/441,166

(22) Filed: Feb. 23, 2017

(65) Prior Publication Data

US 2017/0243397 A1 Aug. 24, 2017

Related U.S. Application Data

(60) Provisional application No. 62/299,302, filed on Feb. 24, 2016.

(51) Int. Cl.
*G06K 9/62* (2006.01)
*G06K 9/00* (2006.01)
(Continued)

(52) U.S. Cl.
CPC ....... *G06K 9/6209* (2013.01); *G06K 9/00214* (2013.01); *G06K 9/469* (2013.01);
(Continued)

(58) Field of Classification Search
CPC ......... G06T 15/08; G06T 17/00; G06T 17/05; G06T 17/10; G06T 17/20; G06T 17/30;
(Continued)

(56) References Cited

U.S. PATENT DOCUMENTS

2008/0180448 A1* 7/2008 Anguelov ............... G06T 13/40 345/475
2018/0114363 A1* 4/2018 Rosenbaum ......... H04N 13/207

OTHER PUBLICATIONS

Allen, B., Curless, B., & Popovic, Z. (Jul. 2003). The space of human body shapes: reconstruction and parameterization from range scans. In ACM transactions on graphics (TOG) (vol. 22, No. 3, pp. 587-594). ACM (Year: 2003).*

(Continued)

*Primary Examiner* — Sae Won Yoon
(74) *Attorney, Agent, or Firm* — Proskauer Rose LLP

(57) ABSTRACT

Described herein are methods and systems for closed-form 3D model generation of non-rigid complex objects from scans with large holes. A computing device receives (i) a partial scan of a non-rigid complex object captured by a sensor coupled to the computing device; (ii) a partial 3D model corresponding to the object, and (iii) a whole 3D model corresponding to the object, wherein the partial 3D scan and the partial 3D model each includes one or more large holes. The device performs a rough match on the partial 3D model and changes the whole 3D model using the rough match to generate a deformed 3D model. The device refines the deformed 3D model using a deformation graph, reshapes the refined deformed 3D model to have greater detail, and adjusts the whole 3D model according to the reshaped 3D model to generate a closed-form 3D model that closes holes in the scan.

28 Claims, 12 Drawing Sheets

Input: Whole Model, Partial Model with Holes, Partial Scan with Holes

Perform a rough match on the partial model 202

Change the whole model using a deformation graph algorithm 204

Refine the rough match from step 202 206

Refine the deformed model from step 204 using a deformation graph algorithm 208

Reshape the deformed model from step 208 to have greater detail 210

Change the deformed model from step 208 according to the reshaped model from step 210 212

Output: 3D Model with Holes Filled

200

(51) Int. Cl.
*G06K 9/46* (2006.01)
*G06K 9/68* (2006.01)
*G06T 17/00* (2006.01)
*G06T 19/20* (2011.01)

(52) U.S. Cl.
CPC ............ *G06K 9/6892* (2013.01); *G06T 17/00* (2013.01); *G06T 19/20* (2013.01); *G06T 2210/56* (2013.01); *G06T 2219/2021* (2013.01)

(58) Field of Classification Search
CPC ........... G06T 19/00; G06T 2207/10028; G06T 2210/56; G06T 2219/2021; G06K 9/00214; G06K 9/469; G06K 9/6209; G06K 9/6892; G01S 17/89
USPC .......................................................... 345/420
See application file for complete search history.

(56) References Cited

OTHER PUBLICATIONS

Stoll, Carsten, et al. "Template Deformation for Point Cloud Fitting." SPBG. 2006 (Year: 2006).*

* cited by examiner

SHAPE-BASED REGISTRATION FOR NON-RIGID OBJECTS WITH LARGE HOLES

RELATED APPLICATIONS

This application claims priority to U.S. Provisional Patent Application No. 62/299,302, filed on Feb. 24, 2016, the entirety of which is incorporated herein by reference.

TECHNICAL FIELD

The subject matter of this application relates generally to methods and apparatuses, including computer program products, for registering a source image of an object (reference generic model) with a target image (input scan) of the object with the output of a fully deformed model primarily used in three-dimensional (3D) computer vision object capture, particularly in scenarios where the input scan is missing a large portion due to, e.g., occlusion or not being able to scan 360 degrees completely around the object.

BACKGROUND

Many new software applications, including those developed for mobile device platforms, use 3D computer vision processing to enhance their features, functionality, and user experience. One example of such vision processing is the scanning of objects in three-dimensional space.

Unfortunately, traditional 3D object technology is time consuming and difficult to implement in the real world. The problem is that once the scans are captured and registered via Simultaneous Localization and Mapping (SLAM) (or Fusion) to create a model, the resulting 3D model is usually not closed (e.g., has holes or gaps) or noisy (e.g., not smooth with irregular surfaces). Hence, these scans are manually further processed using a CAD tool to create a fully closed and smooth 3D model which can then be 3D printed or used in animation and virtual reality (VR)/augmented reality (AR) applications.

SUMMARY

Therefore, what is needed are methods and systems for providing a lightweight, robust 3D computer vision processing toolkit that outputs a fully formed, closed 3D model even when the input scan has large holes or is missing sections or chunks. The methods and systems described herein also provide the advantage of allowing 3D computer vision applications to interact with the real world, allowing the creation of a 3D model from noisy and partial input scans of non-rigid, complex objects. Such methods and systems are available by implementing the shape-based registration module in Starry Night SDK, available from VanGogh Imaging, Inc. of McLean, Va., for the Windows®, Android®, Linux®, iOS®, or Unity® game engine platforms. In addition, shape-based recognition techniques to be used in conjunction with the present technology are described in U.S. patent application Ser. No. 14/324,891, titled "Real-Time 3D Computer Vision Processing Engine for Object Recognition, Reconstruction, and Analysis," and U.S. patent application Ser. No. 14/954,775, titled "Closed-Form 3D Model Generation of Non-Rigid Complex Objects from Incomplete and Noisy Scans," which are incorporated by reference herein in their entirety.

The invention, in one aspect, features a computerized method of closed-form 3D model generation of non-rigid complex objects from scans with large holes. An image processing module of a computing device receives (i) a partial scan of a non-rigid complex object captured by a sensor coupled to the computing device, (ii) a partial 3D model corresponding to the object, and (iii) a whole 3D model corresponding to the object, where the partial 3D scan and the partial 3D model each includes one or more large holes. The image processing module performs a rough match on the partial 3D model. The image processing module changes the whole 3D model using the rough match to generate a deformed 3D model. The image processing module refines the deformed 3D model using a deformation graph. The image processing module reshapes the refined deformed 3D model to have greater detail. The image processing module adjusts the whole 3D model according to the reshaped 3D model to generate a closed-form 3D model that closes the holes in the scan.

The invention, in another aspect, features a system for closed-form 3D model generation of non-rigid complex objects from scans with large holes. The system comprises a computing device having an image processing module of a computing device that receives (i) a partial scan of a non-rigid complex object captured by a sensor coupled to the computing device, (ii) a partial 3D model corresponding to the object, and (iii) a whole 3D model corresponding to the object, where the partial 3D scan and the partial 3D model each includes one or more large holes. The image processing module performs a rough match on the partial 3D model. The image processing module changes the whole 3D model using the rough match to generate a deformed 3D model. The image processing module refines the deformed 3D model using a deformation graph. The image processing module reshapes the refined deformed 3D model to have greater detail. The image processing module adjusts the whole 3D model according to the reshaped 3D model to generate a closed-form 3D model that closes the holes in the scan.

The invention, in another aspect, features a computer program product, tangibly embodied in a non-transitory computer readable storage device, for closed-form 3D model generation of non-rigid complex objects from scans with large holes. The computer program product includes instructions that, when executed, cause an image processing module of a computing device to receive (i) a partial scan of a non-rigid complex object captured by a sensor coupled to the computing device, (ii) a partial 3D model corresponding to the object, and (iii) a whole 3D model corresponding to the object, where the partial 3D scan and the partial 3D model each includes one or more large holes. The image processing module performs a rough match on the partial 3D model. The image processing module changes the whole 3D model using the rough match to generate a deformed 3D model. The image processing module refines the deformed 3D model using a deformation graph. The image processing module reshapes the refined deformed 3D model to have greater detail. The image processing module adjusts the whole 3D model according to the reshaped 3D model to generate a closed-form 3D model that closes the holes in the scan.

Any of the above aspects can include one or more of the following features. In some embodiments, performing a rough match on the partial 3D model comprises deforming the partial 3D model to at least partially match the partial scan by creating holes in the partial 3D model that are similar to the holes in the partial scan, and deforming the holes in the partial 3D model based upon the step of deforming the partial 3D model. In some embodiments, deforming the partial 3D model is performed using a coherent point drift algorithm. In some embodiments, deforming the holes in the partial 3D model is performed using a thin-plate spline algorithm. In some embodiments, the partial 3D model and the partial scan are down-sampled before deforming the partial 3D model.

In some embodiments, refining the deformed 3D model using a deformation graph comprises uniformly down-sampling the whole 3D model and building a deformation graph based upon the down-sampled whole 3D model. In some embodiments, building a deformation graph comprises generating a deformation node for each point in the down-sampled whole 3D model, initializing a 3D position of each deformation node using a 3D position of the corresponding point, searching neighboring deformation nodes for each deformation node within a predetermined distance, initializing a 3D affine matrix and a translation vector for each deformation node based upon the searched neighboring deformation nodes, and assigning a list of the generated deformation nodes, the 3D position of each deformation node, the 3D affine matrix of each deformation node, and the translation vector of each deformation node to the deformation graph. In some embodiments, the image processing module deforms each deformation node of the deformation graph to match at least one point in the partial scan. In some embodiments, the 3D affine matrix of each deformation node is kept as rigid as possible during the deforming step. In some embodiments, a first deformation influence of each deformation node to one or more neighbor deformation nodes is kept as similar as possible to a second deformation influence of the neighbor deformation nodes to the deformation node. In some embodiments, the image processing module optimizes the deformation graph based upon at least one of rigidity, smoothness, and fit.

In some embodiments, reshaping the refined deformed 3D model to have greater detail comprises identifying, for each point in the refined deformed 3D model, one or more neighbor points in the refined deformed 3D model, determining an average distance between each point and its neighbor points, identifying, for each point in the refined deformed 3D model, one or more neighbor points in the partial scan, selecting one or more of the neighbor points in the partial scan that are located inside a cylinder region of the scan, determining an average of the neighbor points in the partial scan that are located inside the cylinder region, and moving each point in the refined deformed 3D model to the average of the neighbor points in the partial scan. In some embodiments, a center of the cylinder region is the point in the refined deformed 3D model, an axis of the cylinder region is a normal of the point in the refined deformed 3D model, and a radius of the cylinder region is the average distance between each point and its neighbor points. In some embodiments, adjusting the whole 3D model according to the reshaped 3D model comprises deforming one or more points in the whole 3D model to match one or more corresponding points in the reshaped 3D model.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the technology described above, together with further advantages, may be better understood by referring to the following description taken in conjunction with the accompanying drawings. The drawings are not necessarily to scale, emphasis instead generally being placed upon illustrating the principles of the technology.

DETAILED DESCRIPTION

The methods and systems described herein provide the process of creating a fully formed, closed 3D model from scans captured using 3D depth sensors that allows easy-to-use 3D computer vision processing software applications to interact with the real world. Generally, shape-based registration is very tolerant of noisy or partial input scans. As a result, application builders can use the shape-based registration functions to create a fully-closed and smooth 3D model without the need for further manual processing.

In some embodiments, the methods and systems can provide individual scans of the scene using a 3D scanner. A Simultaneous Localization and Mapping (SLAM) model captures the scene in 3D. An Object Recognition function is performed real-time by examining the captured scene and looking for an object based on a reference model. Once the object is recognized, a Shaped-Based Registration process provides registering a source image (e.g., a reference generic model) with a target image (e.g., an input scan) of the object. Shape-based registration deforms the reference model to match the scan points of the input resulting in the output of a fully-formed 3D model.

In some embodiments, the methods and systems integrate with multiple operating system platforms. Further, some embodiments of the methods and systems described herein are designed to take advantage of hardware acceleration techniques, such as using a field programmable gate array (FPGA), a graphics processing unit (GPU), and/or a digital signal processor (DSP).

Exemplary techniques provided by the methods and systems described herein include Simultaneous Localization and Mapping (SLAM) functions, which are used for 3D reconstruction, augmented reality, robot controls, and many other applications. Other exemplary techniques include object recognition capability for any type of 3D object. The SLAM and object recognition capabilities can be enhanced to include analysis tools for measurements and feature extraction. In some embodiments, the systems and methods described herein interface to any type of 3D sensor or stereo camera (e.g., a Carmine™ 3D Sensor available from PrimeSense of Tel-Aviv, Israel or a RealSense™ 3D Camera available from Intel Corp. of Santa Clara, Calif.).

Figure 1:
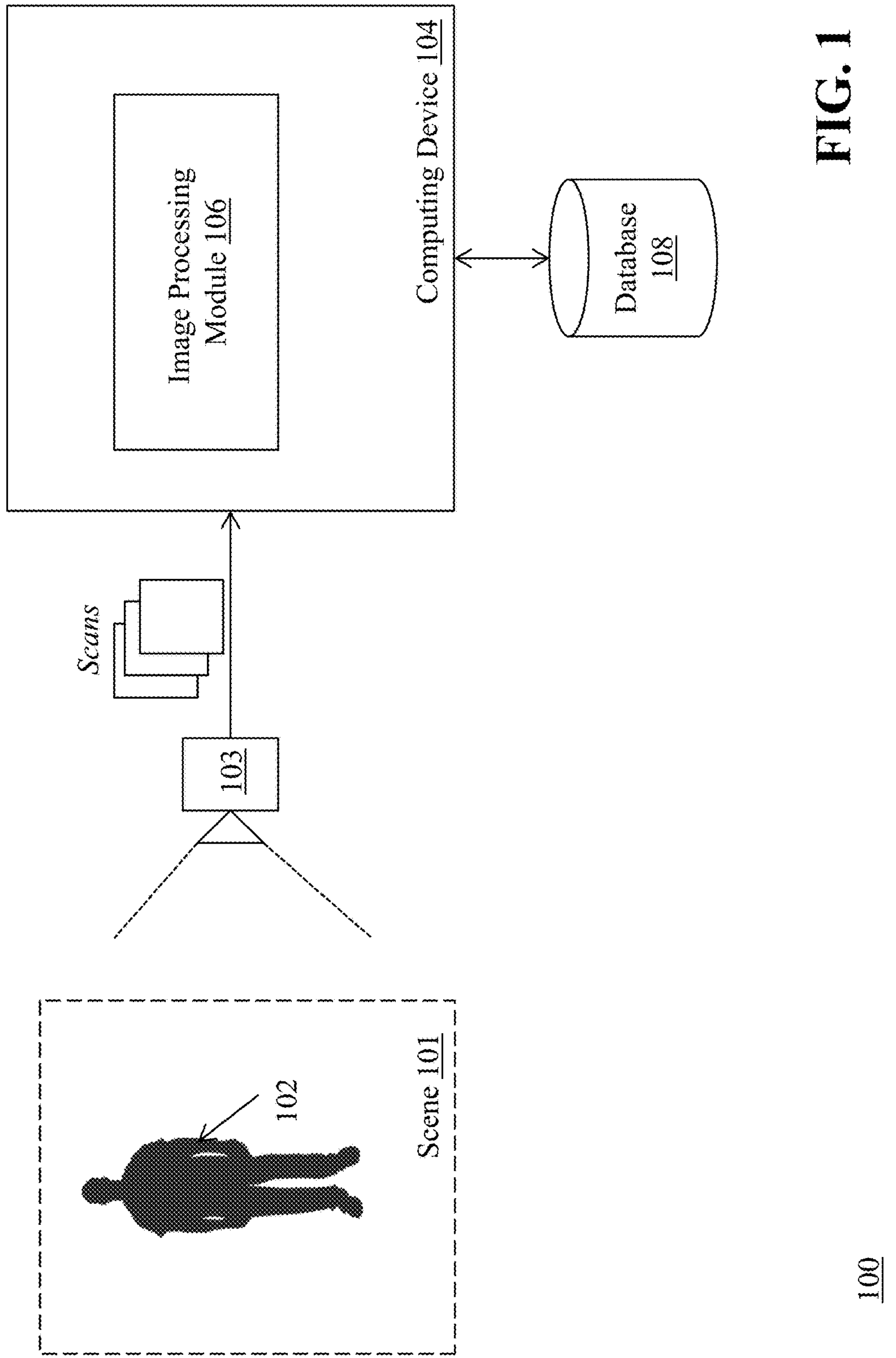
FIG. 1 is a block diagram of a system for closed-form 3D model generation of non-rigid complex objects from scans having large holes.

FIG. 1 is a block diagram of a system 100 for closed-form 3D model generation of non-rigid complex objects from scans having large holes. The system includes a sensor 103 coupled to a computing device 104. The computing device 104 includes an image processing module 106. The computing device is also coupled to a database 108.

The sensor 103 is positioned to capture images of a scene 101 which includes one or more non-rigid objects such as people (e.g., object 102). Exemplary sensors that can be used in the system 100 include, but are not limited to, 3D scanners, digital cameras, and other types of devices that are capable of capturing images of a real-world object and/or scene to collect data on its position, location, and appearance. In some embodiments, the sensor 103 is embedded into the computing device 104, such as a camera in a smartphone, for example.

The computing device 104 receives scans (or images) of the scene 101 from the sensor 103 and processes the images to generate 3D models of the objects (e.g., object 102) represented in the scene 101. The computing device 104 can take on many forms, including both mobile and non-mobile forms. Exemplary computing devices include, but are not limited to, a laptop computer, a desktop computer, a tablet computer, a smart phone, an internet appliance, or the like. It should be appreciated that other computing devices (e.g., an embedded system) can be used without departing from the scope of the invention. The mobile computing device 102 includes network-interface components to connect to a communications network. In some embodiments, the network-interface components include components to connect to a wireless network, such as a Wi-Fi or cellular network, in order to access a wider network, such as the Internet.

The computing device 104 includes an image processing module 106 configured to receive images captured by the sensor 103 and analyze the images in a variety of ways, including detecting the position and location of objects represented in the images and generating 3D models of objects in the images. The image processing module 106 is a hardware and/or software module that resides on the computing device 106 to perform functions associated with analyzing images capture by the scanner, including the generation of 3D models based upon objects in the images. In some embodiments, the functionality of the image processing module 106 is distributed among a plurality of computing devices. In some embodiments, the image processing module 106 operates in conjunction with other modules that are either also located on the computing device 104 or on other computing devices coupled to the computing device 104. An exemplary image processing module is the Starry Night SDK, available from VanGogh Imaging, Inc. of McLean, Va., for the Unity® game engine, or other similar libraries. It should be appreciated that any number of computing devices, arranged in a variety of architectures, resources, and configurations (e.g., cluster computing, virtual computing, cloud computing) can be used without departing from the scope of the invention.

The database 108 is coupled to the computing device 104, and operates to store data used by the image processing module 106 during its image analysis functions. The database 108 can be integrated with the server computing device 104 or be located on a separate computing device. An example database that can be used with the system 100 is MySQL™ available from Oracle Corp. of Redwood City, Calif.

Figure 2:
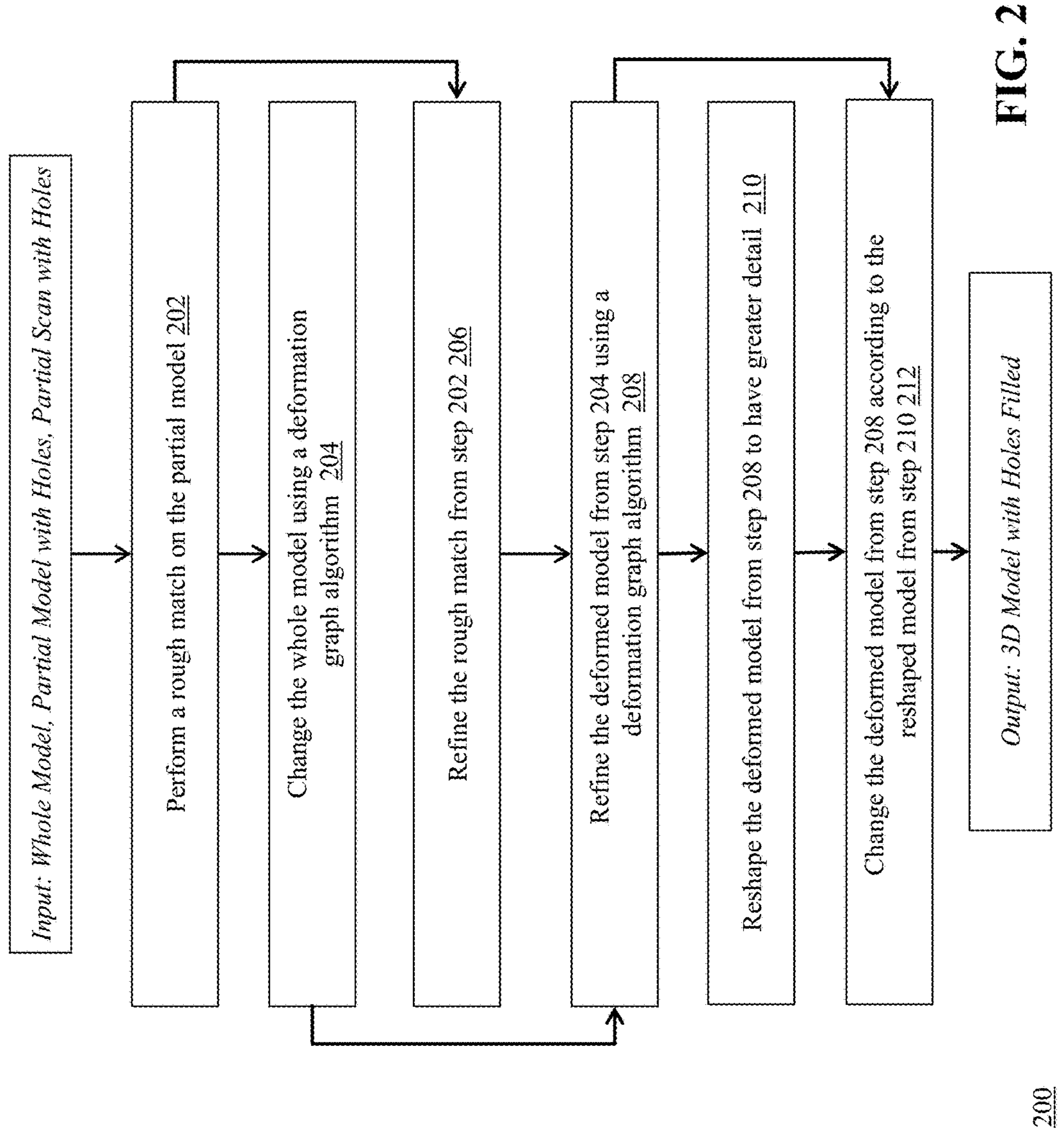
FIG. 2 is a flow diagram of a method for closed-form 3D model generation of non-rigid complex objects from scans having large holes.

FIG. 2 is a flow diagram of a method 200 for closed-form 3D model generation of non-rigid complex objects from scans having large holes. An example of a non-rigid complex object can be a human. It should be understood that other types of non-rigid, complex objects can be scanned, and the scans analyzed and registered, using the same techniques. The flow diagram shows the steps of achieving a match between a generic reference model and an input scan, which results in an output of a deformed generic model. The method will be described in greater detail in the following sections.

Figure 3A:
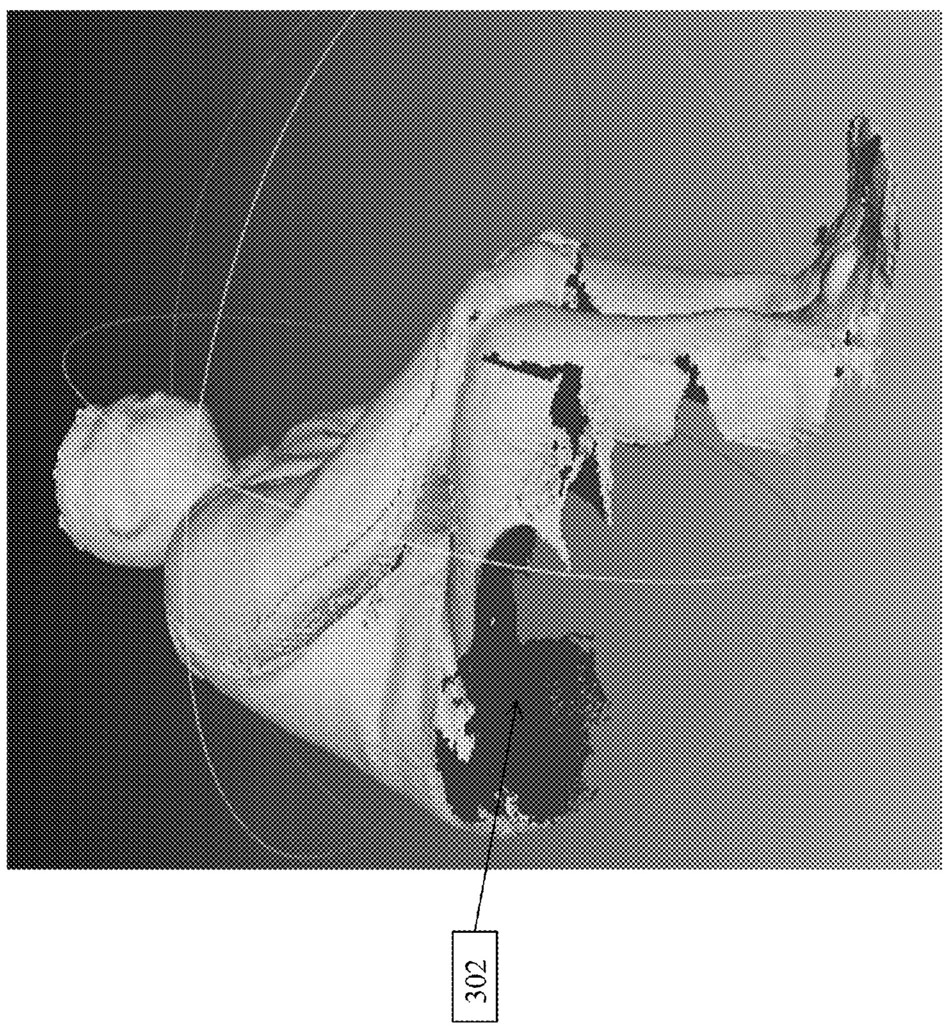
FIG. 3A is a partial scan of a person used in the input step of the method of FIG. 2.
Figure 3B:
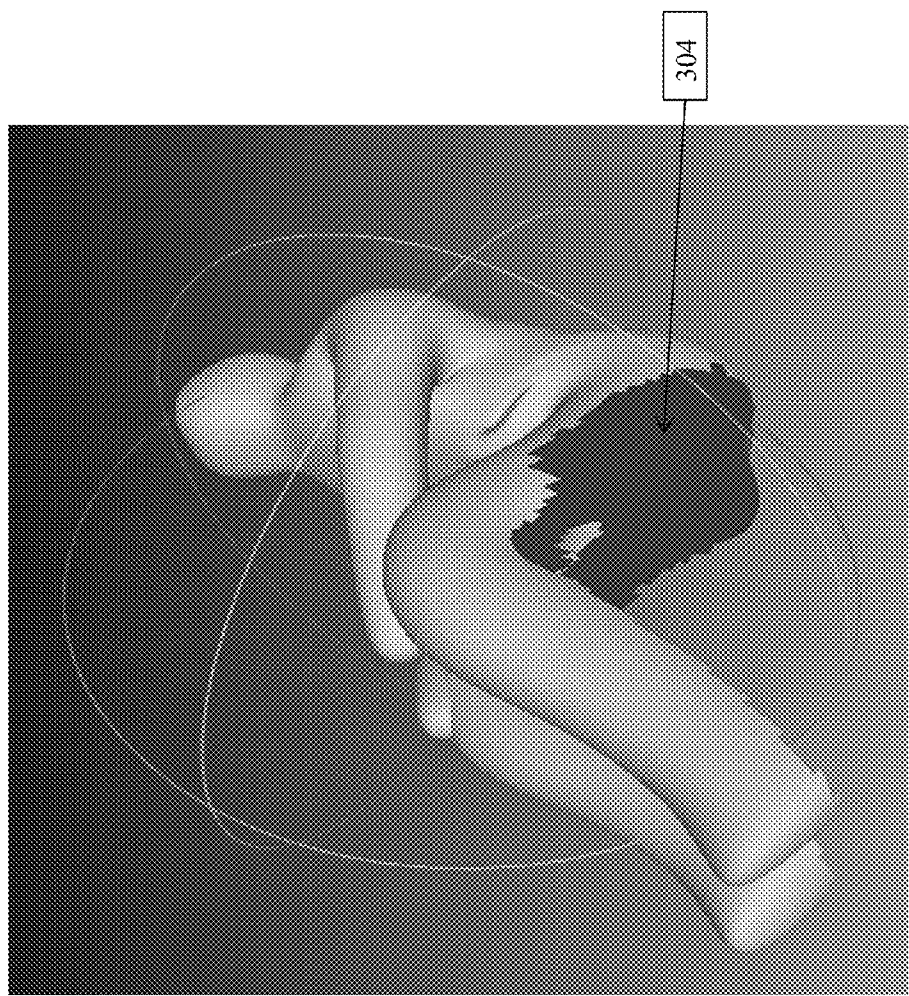
FIG. 3B is a partial model used in the input step of the method of FIG. 2.

FIG. 3A shows a partial scan of a person used in the Input step of the method 200 of FIG. 2, and FIG. 3B shows a partial model used in the Input step of the method 200. As shown in FIG. 3A, the scan depicts a person that is seated and the scan is missing a large portion 302 of the bottom side of the person's legs, due to occlusion from the chair on which the person is sitting. Similarly, the model shown in FIG. 3B is missing a portion 304 that corresponds to the missing portion of the scan.

Returning to FIG. 2, once the input partial model and input scan are received by the image processing module 106, the module 106 performs (202) a rough match on the partial model using non-rigid deformation where the overall shape of the model is changed according to the scan. This part of the process focuses on local rigid and global non-rigid parameter values. An exemplary algorithm for performing non-rigid registration is the Coherent Point Drift algorithm, as described in Andriy Myronenko and Xubo Song, "Point Set Registration: Coherent Point Drift," IEEE Transactions on Pattern Analysis and Machine Intelligence, Vol. 32, Issue 12 pp. 2262-2275 (December 2010), which is incorporated herein by reference.

In one example of non-rigid registration, the image processing module 106 deforms the input partial model to at least partially match the input scan by creating holes or gaps in the model that are similar to the holes or gaps in the scan. In some embodiments, the module 106 receives a SLAM Camera Trace as input from the sensor 103 and the module 106 cleans both the input partial model and the input scan based upon the SLAM Camera Trace. Specifically, the image processing module 106 cleans both the model and the scan by projecting the model and the scan to a camera plane with different camera angles based upon the SLAM Camera Trace.

For example:

1) Using different camera angles, the image processing module 106 projects the input partial model and/or the input scan to a rough camera plane. The points in the model and/or the scan with the smallest depth value (each 3D point has three dimensions x, y, and z, so the smallest depth value means the smallest z value) are recorded, e.g. if one of the camera angles (directions) is such that the camera points to the person's face (i.e., front of the person's head), then because the points of the face have a smaller depth (z) value than that of the points in the back of the head, points that belong to the face, instead of the back of the head, are recorded from this angle.

2) The image processing module projects the model and/or the scan to the same camera plane and points which are far from the recorded points are ignored.

The non-rigid registration algorithm generates more robust and constant results, i.e., the matching result of the cleaned model to the cleaned scan is better than that of the input partial model to the input scan. Otherwise, the image processing module 106 may not be able to register the object in the scan because the object does not sufficiently match the model—for example, the model would not have a gap at the top of the head and the image processing module 106 would not recognize the object in the scan as matching the model because of this difference.

Following the non-rigid registration process described above, in some embodiments the image processing module 106 deforms the holes or gaps present in the model based on the matching result of the cleaned model to the cleaned scan by using, for example, a Thin-Plate Spline algorithm. An exemplary Thin-Plate Spline algorithm is described in Fred L. Bookstein, "Principal Warps: Thin-Plate Splines and the Decomposition of Deformations," IEEE Transactions on Pattern Analysis and Machine Intelligence, Vol. 11, No. 6, June 1989, which is incorporated herein by reference. Also, for performance purposes, it may be necessary in some cases for the image processing module 106 to down-sample the cleaned model and the cleaned scan before performing the non-rigid registration process.

The module 106 then takes as input the rough match of the partial model (also called a deformed model), along with the original input partial model and the original whole model, from step 202 and changes (204) the whole model to be as rigid as possible using a deformation graph algorithm. The image processing module 106 uniformly down-samples the original whole model, and builds a deformation graph based upon the down-sampled points of the original whole model.

The deformation graph comprises a list of deformation nodes. Each node has a 3D position, a list of neighbor deformation nodes, and a 3D affine matrix and a 3D translation vector for deformation. To build the deformation graph using the down-sampled points of the original whole model, the image processing module 106 represents each down-sampled point by a deformation node, and initializes the 3D position of the deformation node as the 3D position of the down-sampled point. The image processing module 106 searches the neighboring deformation nodes within a certain distance, and initializes the 3D affine matrix as an identity matrix and the translation vector as a zero vector.

The image processing module 106 then deforms the entire deformation graph using an embedded deformation for shape manipulation algorithm based on the partially-matched deformed model. An exemplary embedded deformation for shape manipulation algorithm is described in Robert W. Sumner, et al., "Embedded Deformation for Shape Manipulation," Applied Geometry Group, ETH Zurich, SIGGRAPH 2007, which is incorporated herein by reference.

At this step, some deformation nodes have matched points in the scan and other deformation nodes do not have matched points. The deformation nodes that have matched points in the scan deform to their matched points in the scan. The remaining deformation nodes are deformed according to the deformation nodes that deform to their matched points in the scan. In order to keep the smoothness and rigidness in the deformation result, the affine matrix of each deformation node is kept as rigid as possible, and the deformation influence of each deformation node to its neighbor nodes is kept as similar as possible to the deformation influence of its neighbor nodes to itself.

Using the embedded deformation for shape manipulation algorithm, the module 106 optimizes the deformation graph by three energy terms:

1) Rigid Term, which optimizes the affine matrix as rigid as possible:

$$E_{Rigid} = \sum \text{Rot}(\text{Affine Matrix}_i)$$

$$\text{Rot}(A) = (c_1 * c_2)^2 + (c_1 * c_3)^2 + (c_2 * c_3)^2 + (c_1 * c_2 - 1)^2 + (c_1 * c_3 - 1)^2 + (c_2 * c_3 - 1)^2$$

where $c_i$ is the i-th column of matrix A, if A is rotation matrix, Rot(A) is zero.

2) Smooth Term, which optimizes the deformation graph as smooth as possible:

$$E_{Smooth} = \sum_i \sum_{k,i's\ neighbor} \|A_i(p_k - p_i) + p_i + T_i - (p_k + T_k)\|_2^2$$

where A is the affine matrix, T is the translation vector, and p is the node's position.

3) Fit Term, which optimizes the original partial model deformed by the deformation graph as close to the deformed partial model as possible:

$$E_{Fit} = \Sigma \|v - q\|_2^2$$

where v is the deformation node's position deformed by the deformation graph, q is the deformation node's corresponding position in the deformed partial model.

The deformation graph is built based upon the original whole model, so some deformation nodes may not have a Fit Term. However, because these nodes still have a Rigid Term and a Smooth Term, their affine matrices and translation vectors are optimized.

The image processing module 106 then deforms the deformed model based upon the deformation graph. For each point in the deformed model, the image processing module 106 finds the neighbor deformation nodes in the deformation graph and deforms the point by the affine matrices and translation vectors of that point's neighbor deformation nodes. The image processing module 106 generates an output of the deformed model matching the scan.

Returning to FIG. 2, the module 106 takes the rough match of the partial model from step 202 and refines (206) the match on the partial model using non-rigid deformation where the overall shape of the model is changed according to the scan. Differently from step 202, however, this part of the process focuses on local non-rigid and global rigid parameter values. The module 106 then takes the refined model from step 206 and further refines (208) the deformed model resulting from step 204 to be as rigid as possible using the deformation graph algorithm as described above.

An exemplary energy function based upon the Coherent Point Drift algorithm described above is set forth below. The energy function E is defined by the negative log likelihood between the model and the scan. The likelihood between model M and scan S is defined by Gaussian Mixture Model.

Let $M=\{m_0, m_1, \ldots, m_{Nm}\}$, $S=\{s_0, s_1, \ldots, s_{Ns}\}$ each m and s is 3D point, $W=\{w_0, w_1, \ldots, w_{Nm}\}$, each $w_i$ is weight of $m_i$ in 3D, G is a Nm by Nm matrix and each element $$G_{ij} = e^{-\frac{1}{2}\left\|\frac{m_i - m_j}{\beta}\right\|^2}$$

$$E = -\log\left(\sum_i \sum_j e^{-\frac{1}{2}\left\|\frac{m_i - s_j}{\sigma}\right\|^2}\right) + \frac{\lambda}{2} * \text{trace}(W^T * G * W)$$

where $\beta$ and $\lambda$ are parameters that control the smoothness of non-rigid registration result (the larger the value, the more smoothness and rigid deformation). $\beta$ controls global deformation and $\lambda$ controls local deformation.

Next, the image processing module 106 reshapes (210) the deformed model resulting from step 208 to have greater detail, as provided in the following sub-steps:

1) For every point in the deformed model, the image processing module 106 finds that point's neighbor points in the deformed model.
2) The image processing module 106 calculates an average distance between the point and its neighbor points.
3) For every point in the deformed model, the image processing module 106 finds that point's neighbor points in the scan.
4) Among its neighbor points in the scan, the image processing module 106 finds the points that are located inside a cylinder region whose center is the deformed model point, whose axis is the deformed model point's normal, and whose radius is the average distance that was calculated in sub-step 2.
5) The image processing module 106 averages the points from the scan inside each cylinder region.
6) The image processing module 106 moves each point in the deformed model to its averaged neighbor points in the scan as determined in sub-step 5.

Returning to FIG. 2, once the deformed model is reshaped, the module 106 changes (212) the deformed model resulting from step 208 according to the reshaped model resulting from step 210. The module 106 changes the model points where the corresponding neighbor points were changed using the deformation graph algorithm as described above.

Figure 4:
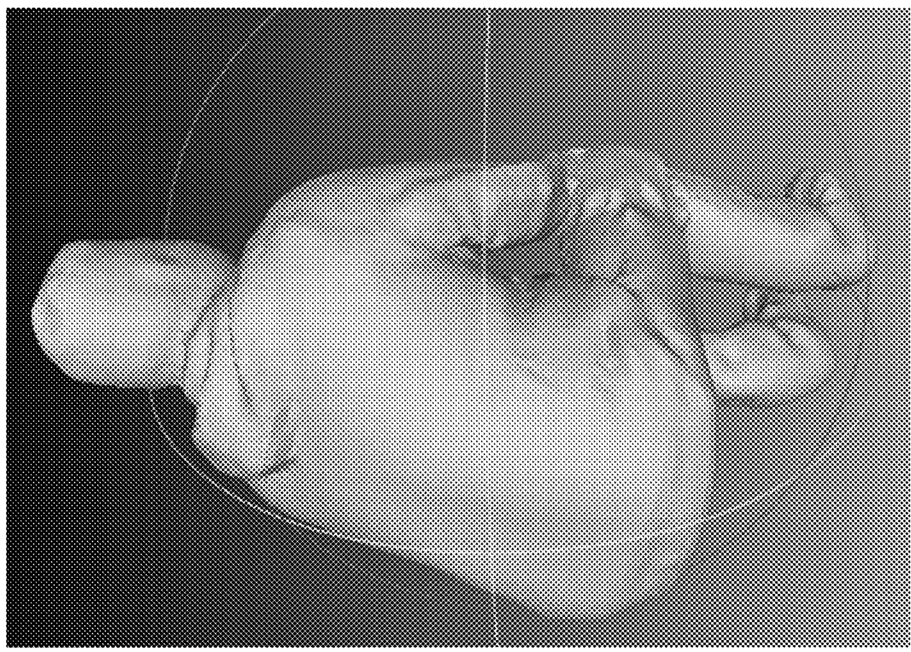
FIG. 4 is a full model of the object where the full model is deformed based upon the information from the deformed partial model.
Figure 4:
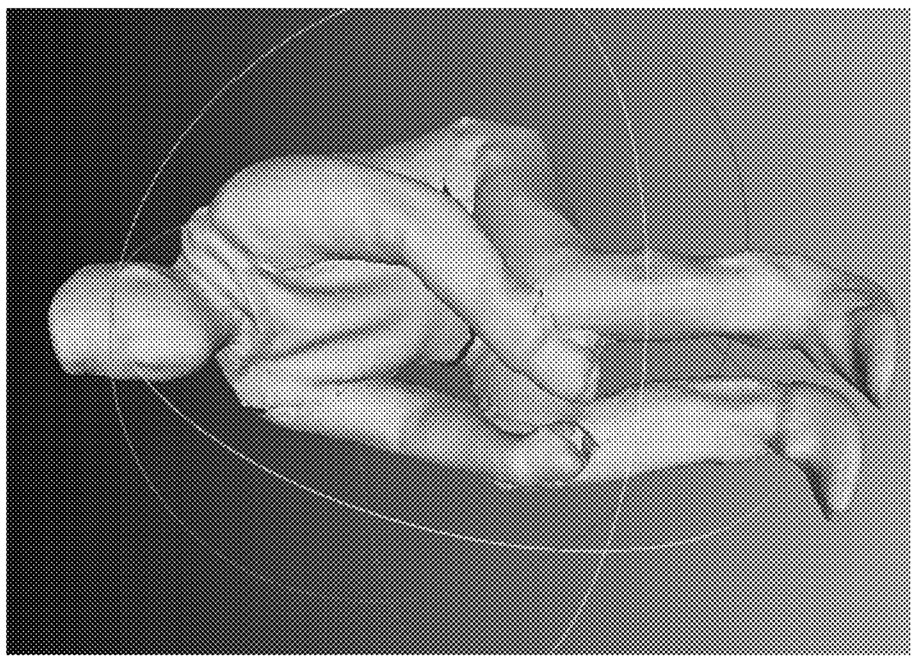

The result of the method 200 of FIG. 2 is shown in FIG. 4, which depicts a full model of the object (e.g., the person) where the full model is deformed based upon the information from the deformed partial model. For example, the area of the full model that overlaps with the scan is deformed to look like the scan, while the area of the full model that does not overlap with the scan retains the shape of the original full model. Also as shown in FIG. 4, the large holes that had existed in the partial model are now filled in based upon the processing described above with respect to FIG. 2.

In addition, the system 100 of FIG. 1 can be used to determine the volume of a 3D object captured in a scan via the fully-formed model. For example, in agriculture it can be important to quickly assess the volume of a particular animal (e.g., prior to sale). The image processing module 106 can process a closed form point cloud of the object as taken from the fully-formed model to determine an approximate volume of the object.

Figure 5:
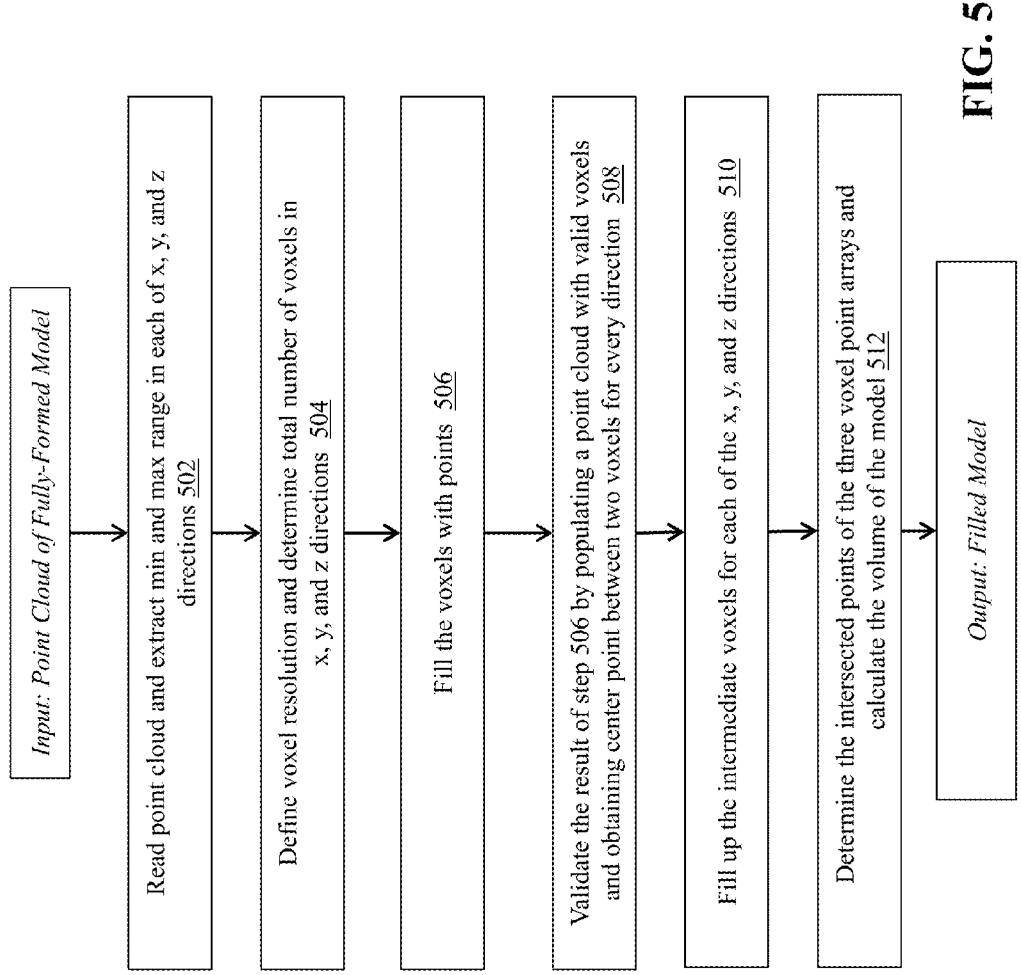
FIG. 5 is a flow diagram of a method for determining a volume of an object from a fully-formed model of the object.
Figure 6A:
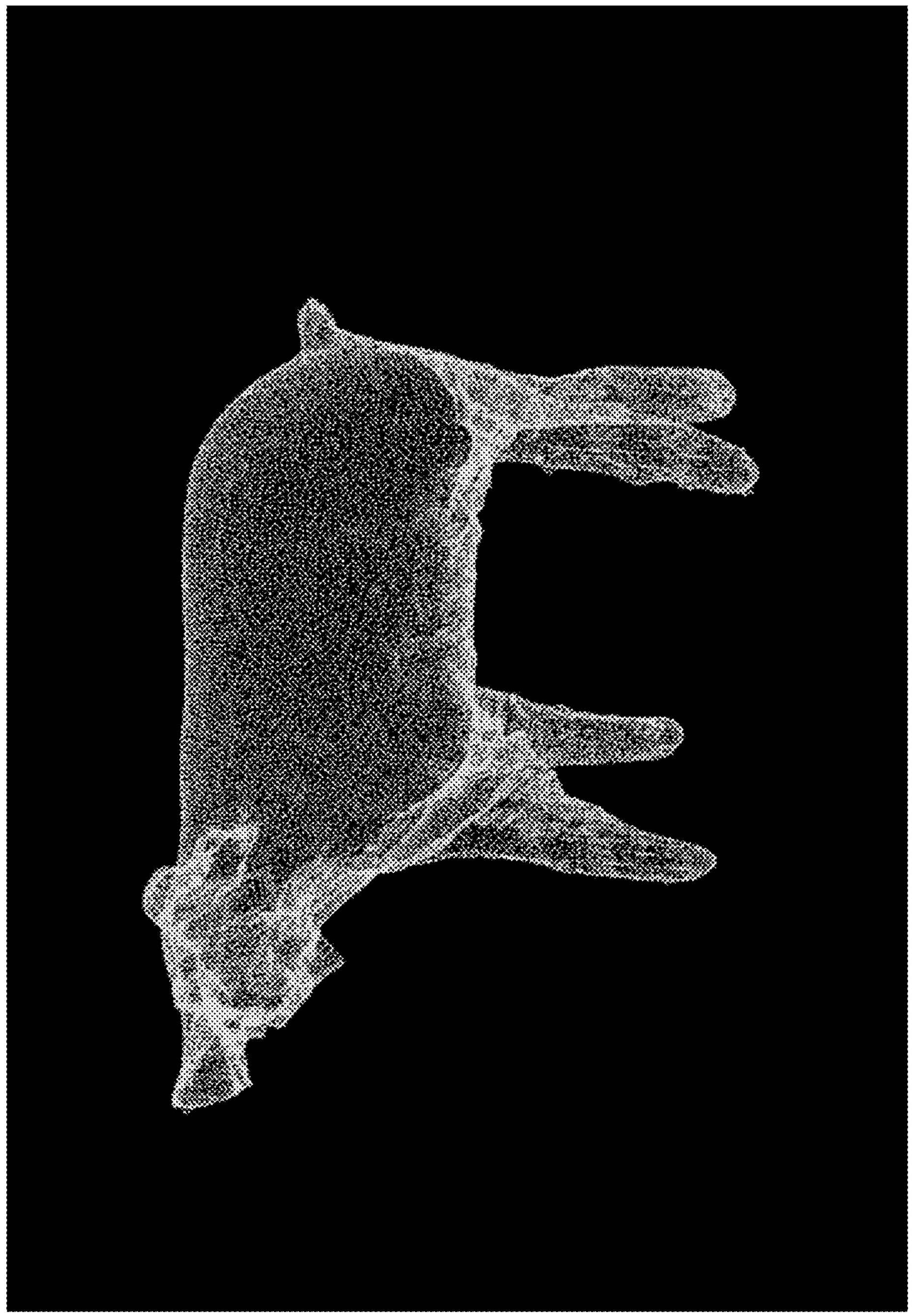
FIG. 6A is a diagram of a 3D point cloud of a fully-formed model.

FIG. 5 is a flow diagram of a method 500 for determining a volume of an object from a fully-formed model of the object, using the system 100 of FIG. 1. The image processing module 106 receives as input the closed-form object points (FIG. 6A is a diagram of a 3D point cloud of a hog) that comprise the fully-formed model. In some embodiments, the point cloud is made denser and more uniformly distributed by refining the mesh.

Figure 6B:
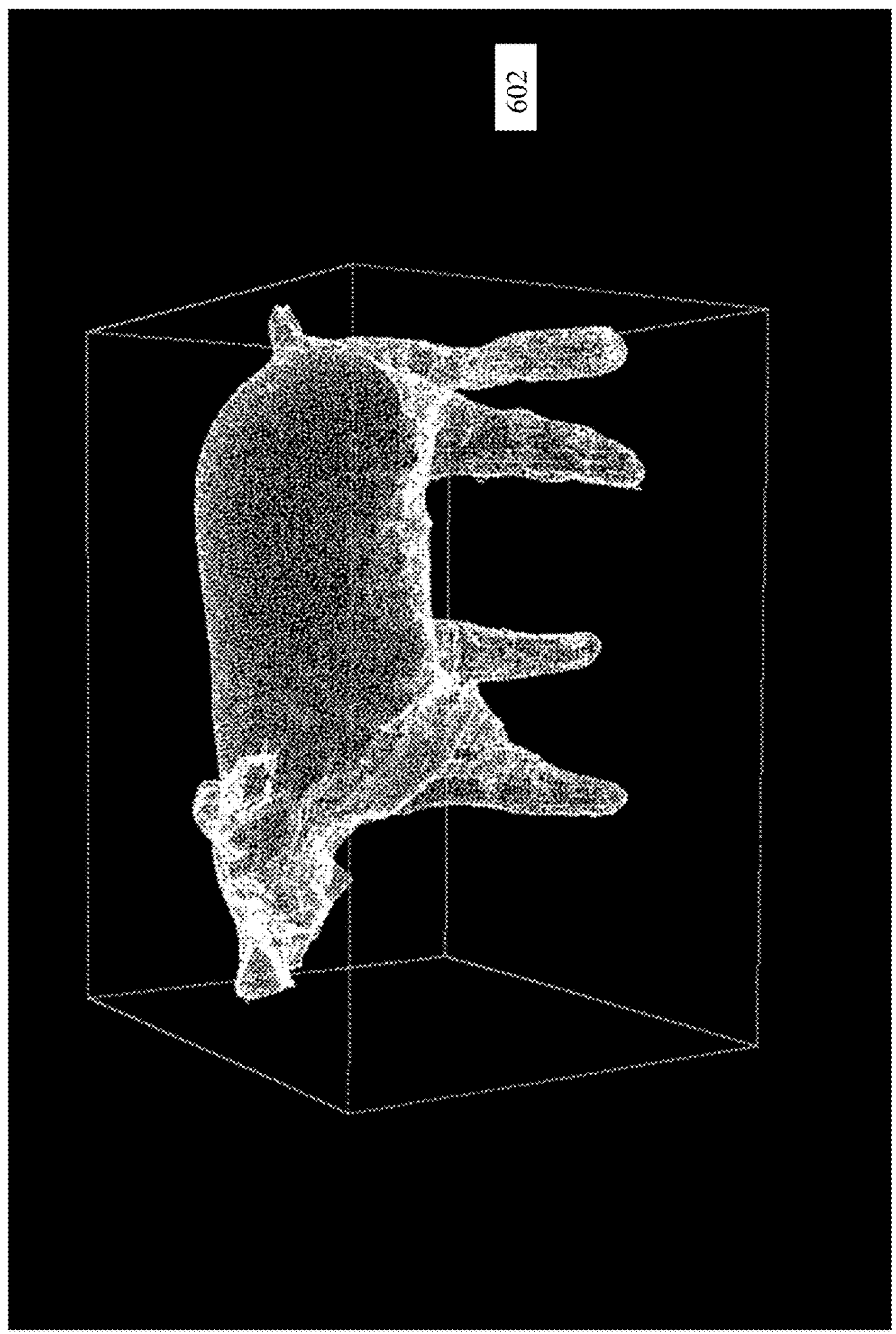
FIG. 6B is a diagram of the 3D point cloud with a virtual box around the point cloud in x, y, and z directions.

The module 106 reads (502) the point cloud of the model and extracts the min and max range in each of the x, y, and z directions. For example, the module 106 can create a virtual box around the model using the six values (e.g., min(x, y, z), max(x, y, z)) in order to confirm the extraction was successful. As shown in FIG. 6B, the virtual box 602 is correctly placed around the point cloud.

Next, the module 106 defines (504) the voxel resolution (e.g., 1.0 cm) and determines the total number of voxels in the x, y, and z directions. The module 106 uses the following formula to determine number of voxels in each direction:

$$voxelSize[0] = \frac{(\text{int})(\max X - \min X)}{voxelRes}$$

$$voxelSize[1] = \frac{(\text{int})(\max Y - \min Y)}{voxelRes}$$

$$voxelSize[3] = \frac{(\text{int})(\max Z - \min Z)}{voxelRes}$$

$$\text{Total number of voxel } (Num) = voxelSize[0] * voxelSize[1] * voxelSize[2]$$

The module 106 fills (506) the voxels with points. In one example, the module 106 defines a Boolean array named isValidVoxel and initializes the array with all zeroes. The module 106 extracts all the points from the model and sets the index values of the points for the isValidVoxel array as true. The module 106 validates (508) the result of step 506 by populating a point cloud with the valid voxels and obtaining the center point between two voxels for every direction. For this validation step 508, the result looks similar to the 3D model itself.

Figure 7A:
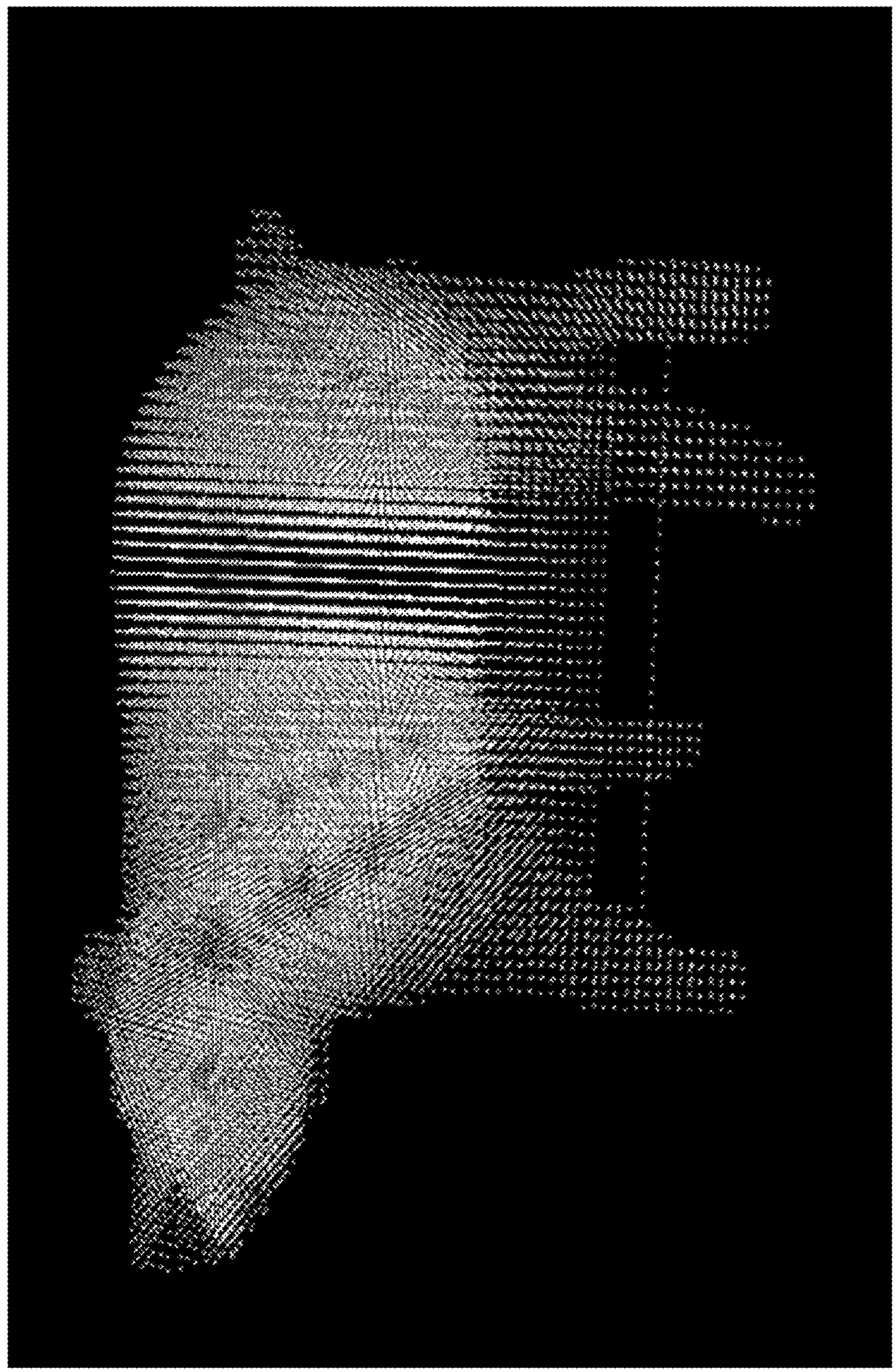
FIG. 7A is a voxel point cloud as filled up using x-direction valid points.
Figure 7B:
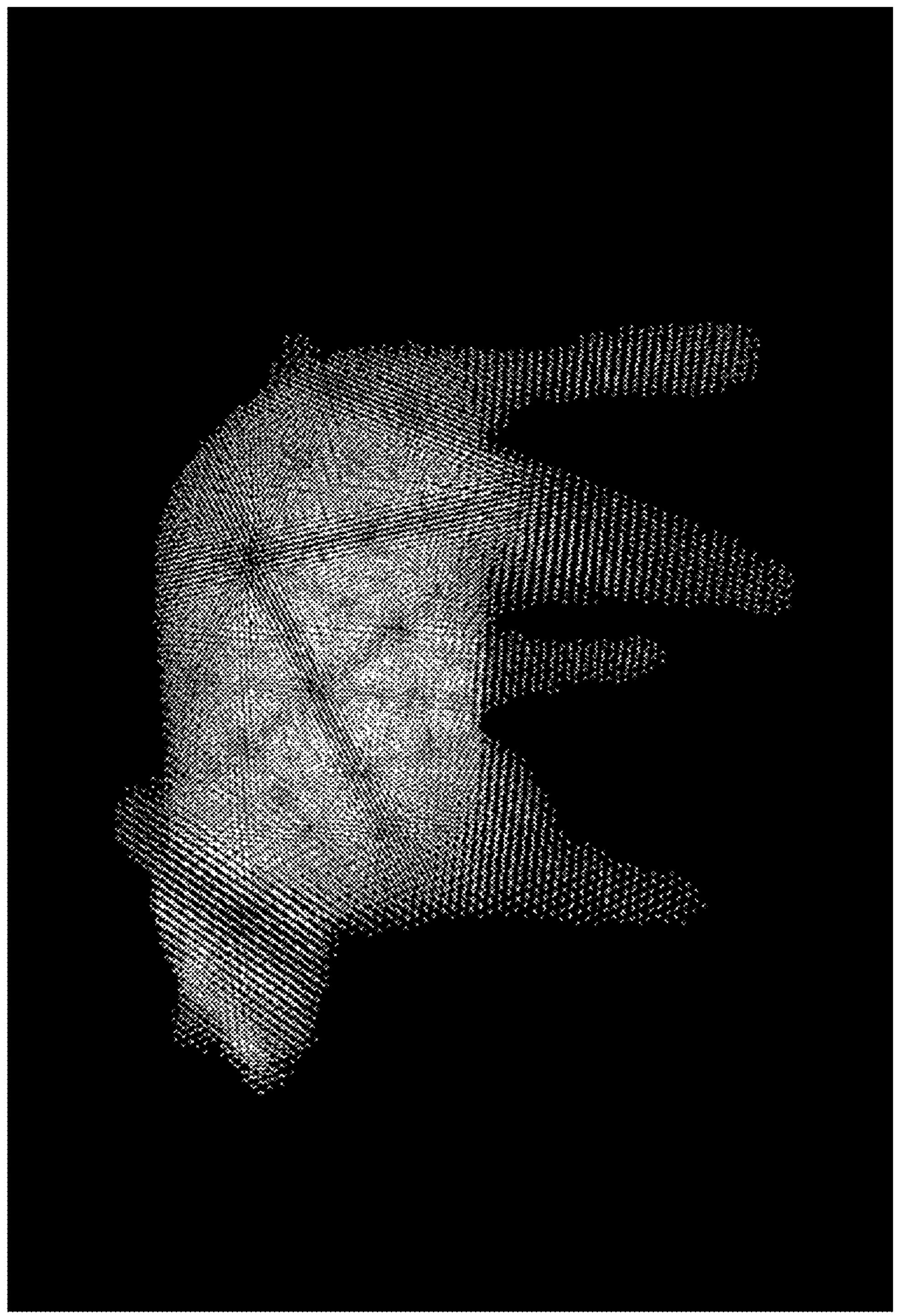
FIG. 7B is a voxel point cloud as filled up using y-direction valid points.
Figure 7C:
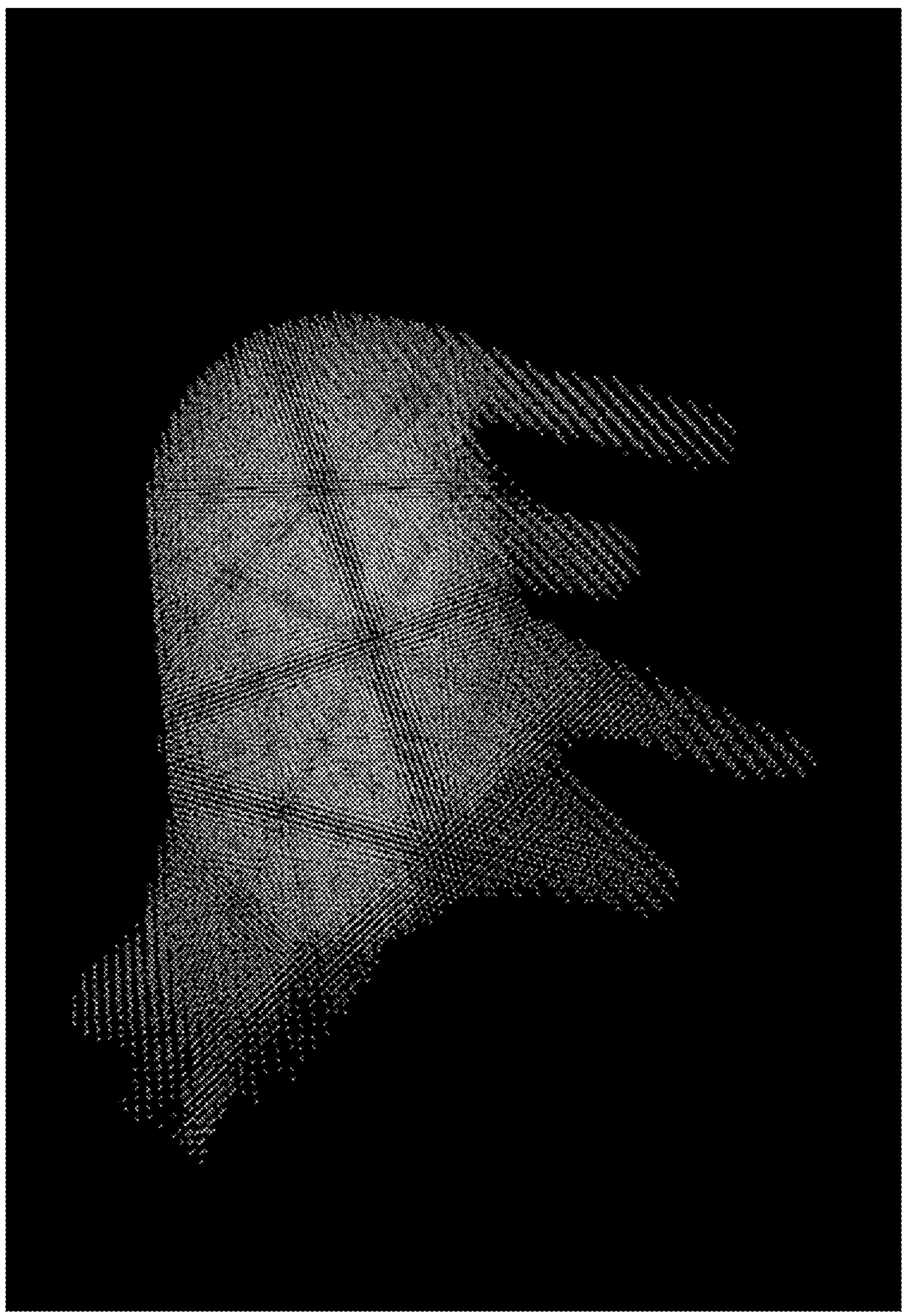
FIG. 7C is a voxel point cloud as filled up using z-direction valid points.

The module 106 then takes the x-direction valid points and fills up (510) the intermediate voxels if a pair of valid voxels is found. This step is repeated for the other two directions (y, and z) and the module 106 calculates three arrays of voxel points, as shown in FIGS. 7A-7C. FIG. 7A depicts the voxel point cloud as filled up using the x-direction valid points. FIG. 7B depicts the voxel point cloud as filled up using the y-direction valid points. FIG. 7C depicts the voxel point cloud as filled up using the z-direction valid points. As a result, the inside of the model (e.g., the hog's body) is filled up in all three directions and the three point cloud files have the inside of the object filled up with points.

Figure 8:
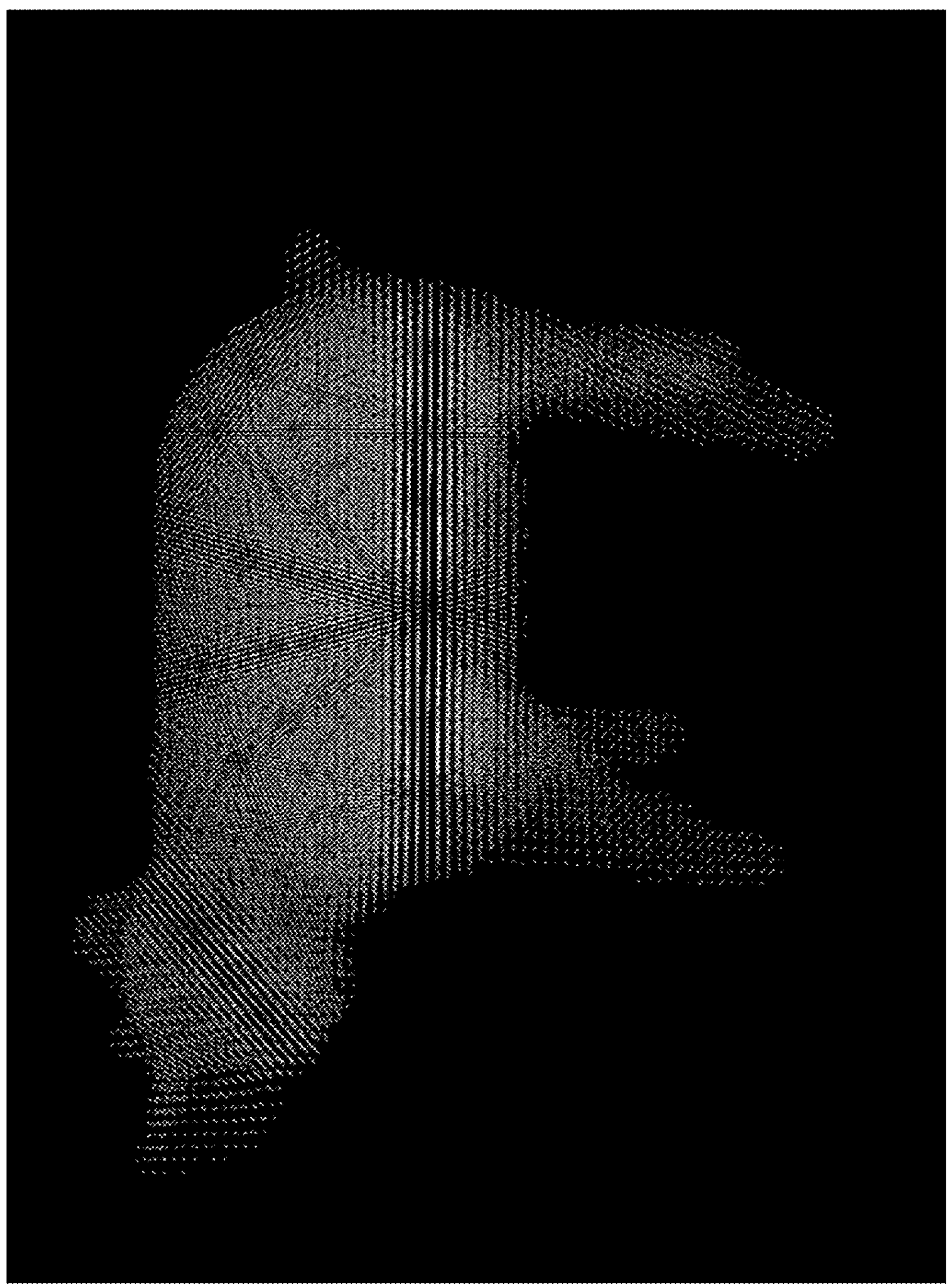
FIG. 8 is a fully-filled model using the point clouds of FIGS. 7A, 7B, and 7C.

The module 106 then determines (512) the intersected points of the three voxel point arrays for x, y, and z directions, which generates a model that appears like the closed-form model but has all of the formerly hollow areas (e.g., the interior) filled up with points—as shown in FIG. 8. The module 106 then calculates the volume of the model by counting the number of points of the model and multiplying the result by the voxel size (e.g., 1 cubic centimeter).

The result of the processing described herein is applicable to many different types of industries and use cases, some of which are described below:

Hologram Generation/Augmented Reality Applications

The methods and systems described herein are applicable to the application of generating real-time 3D holograms of human subjects. For example, as explained herein, a scan of a human subject can be captured and the corresponding model can be deformed in real-time using shape-based registration techniques to provide a fully-formed human model for augmented reality/hologram generation applications—even if only a partial scan of the human subject is captured—by filling in large holes found in the scan(s).

3D Printing

In the 3D printing industry, there is a need to scan particular objects in the real world to be 3D printed. Typically, the scene that contains the target object to be printed is captured and the target object is cropped out manually using a CAD system. The object is further refined so that only the scan points of the object remain. The object is then converted into a 3D model.

The methods and systems for shape-based registration for complex objects as described herein automatically detect the object even in a noisy environment. In addition, the methods and systems enable the detection of the object's pose—making it easy to extract the object scan points from the scene and, just as importantly, associate which points in the object belong to which area of the object. As a result, subsequent 3D reconstruction processes are simpler because many points are already associated with a position within the 3D model.

Parts Inspection

In a manufacturing environment, parts are typically either individually separated or positioned in a known position for inspection. These requirements can add cost and complexity to the machines used for parts inspection as well as the process for inspecting parts.

The methods and systems for shape-based registration for complex objects as described herein automatically detect a part, and the part's features can now be compared against a reference model to identify any defects.

Other Applications

Industries such as medical, security, agriculture, and others can also take advantage of the methods and systems for shape-based Registration for complex objects described herein to simply object recognition processes.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the technology may be embodied in other specific forms without departing from the spirit or essential characteristics thereof. The foregoing embodiments are therefore to be considered in all respects illustrative rather than limiting of the technology described herein.

The invention claimed is:

1. A computerized method for closed-form 3D model generation of non-rigid complex objects from scans with large holes, the method comprising:

receiving, by an image processing module of a computing device, (i) a partial scan of a non-rigid complex object captured by a sensor coupled to the computing device, (ii) a partial 3D model corresponding to the non-rigid complex object, and (iii) a whole 3D model corresponding to the non-rigid complex object, wherein the partial scan and the partial 3D model each includes one or more large holes;

performing, by the image processing module, a rough match between the partial 3D model and the partial scan;

changing, by the image processing module, the whole 3D model using the rough match to generate a deformed 3D model;

refining, by the image processing module, the deformed 3D model using a deformation graph;

reshaping, by the image processing module, the refined deformed 3D model to have greater detail; and adjusting, by the image processing module, the refined deformed 3D model according to the reshaped 3D model to generate a closed-form 3D model that closes the one or more large holes in the partial scan.

2. The method of claim 1, wherein the step of performing a rough match between the partial 3D model and the partial scan further comprises:

deforming, by the image processing module, the partial 3D model to at least partially match the partial scan by creating new holes in the partial 3D model that are similar to the one or more large holes in the partial scan; and deforming, by the image processing module, the one or more large holes in the partial 3D model based upon the step of deforming the partial 3D model to at least partially match the partial scan.

3. The method of claim 2, wherein the step of deforming the partial 3D model to at least partially match the partial scan is performed using a coherent point drift algorithm.

4. The method of claim 2, wherein the step of deforming the one or more large holes in the partial 3D model is performed using a thin-plate spline algorithm.

5. The method of claim 2, wherein the partial 3D model and the partial scan are down-sampled before deforming the partial 3D model to at least partially match the partial scan.

6. The method of claim 1, wherein the step of refining the deformed 3D model using a deformation graph further comprises:

uniformly down-sampling, by the image processing module, the whole 3D model; and building, by the image processing module, the deformation graph based upon the down-sampled whole 3D model.

7. The method of claim 6, wherein the step of building a deformation graph further comprises:

generating, by the image processing module, one or more deformation nodes for each point in the down-sampled whole 3D model;

initializing, by the image processing module, a 3D position of the one or more deformation nodes using a 3D position of a corresponding point in the down-sampled whole 3D model;

searching, by the image processing module, neighboring deformation nodes for the one or more deformation nodes within a predetermined distance;

initializing, by the image processing module, a 3D affine matrix and a translation vector for the one or more deformation nodes based upon the searched neighboring deformation nodes; and assigning, by the image processing module, to the deformation graph, a list of the generated deformation nodes, the 3D position of the one or more deformation nodes, the 3D affine matrix of the one or more deformation nodes, and the translation vector of the one or more deformation nodes.

8. The method of claim 7, further comprising deforming, by the image processing module, the one or more deformation nodes of the deformation graph to match at least one point in the partial scan.

9. The method of claim 8, wherein the 3D affine matrix of the one or more deformation nodes is kept as rigid as possible during the step of deforming the one or more deformation nodes of the deformation graph.

10. The method of claim 8, wherein a first deformation influence of the one or more deformation nodes to at least one of the searched neighboring deformation nodes is kept as similar as possible to a second deformation influence of the at least one of the searched neighboring deformation nodes to the one or more deformation nodes.

11. The method of claim 8, further comprising optimizing, by the image processing module,the deformation graph based upon at least one of rigidity, smoothness, and fit.

12. The method of claim 1, wherein the step of reshaping the refined deformed 3D model to have greater detail further comprises:

identifying, by the image processing module, for each point in the refined deformed 3D model, one or more neighbor points in the refined deformed 3D model;

determining, by the image processing module, an average distance between each point in the refined deformed 3D model and the identified one or more neighbor points in the refined deformed 3D model;

identifying, by the image processing module, for each point in the refined deformed 3D model, one or more neighbor points in the partial scan;

selecting, by the image processing module, one or more of the identified neighbor points in the partial scan that are located inside a cylinder region of the partial scan;

determining, by the image processing module, an average of the selected neighbor points in the partial scan that are located inside the cylinder region of the partial scan; and moving, by the image processing module, each point in the refined deformed 3D model to the average of the selected neighbor points in the partial scan that are located inside the cylinder region of the partial scan.

13. The method of claim 12, wherein:

a center of the cylinder region of the partial scan is a point in the refined deformed 3D model, an axis of the cylinder region of the partial scan is a normal of the point in the refined deformed 3D model, and a radius of the cylinder region of the partial scan is the average distance between each point in the refined deformed 3D model and the one or more neighbor points in the refined deformed 3D model.

14. The method of claim 1, wherein the step of adjusting the refined deformed 3D model according to the reshaped 3D model comprises deforming one or more points in the refined deformed 3D model to match one or more corresponding points in the reshaped 3D model.

15. A system for closed-form 3D model generation of non-rigid complex objects from scans with large holes, the system comprising a computing device having a memory that stores an image processing module and a processor that executes the image processing module to:

receive (i) a partial scan of a non-rigid complex object captured by a sensor coupled to the computing device, (ii) a partial 3D model corresponding to the non-rigid complex object, and (iii) a whole 3D model corresponding to the non-rigid complex object, wherein the partial scan and the partial 3D model each includes one or more large holes;

perform a rough match between the partial 3D model and the partial scan;

change the whole 3D model using the rough match to generate a deformed 3D model;

refine the deformed 3D model using a deformation graph;

reshape the refined deformed 3D model to have greater detail; and adjust the refined deformed 3D model according to the reshaped 3D model to generate a closed-form 3D model that closes the one or more large holes in the partial scan.

16. The system of claim 15, wherein the processor performs the rough match between the partial 3D model and the partial scan by:

deforming the partial 3D model to at least partially match the partial scan by creating new holes in the partial 3D model that are similar to the one or more large holes in the partial scan; and deforming the one or more large holes in the partial 3D model based upon deforming the partial 3D model to at least partially match the partial scan.

17. The system of claim 16, wherein the processor deforms the partial 3D model to at least partially match the partial scan using a coherent point drift algorithm.

18. The system of claim 16, wherein the processor deforms the one or more large holes in the partial 3D model using a thin-plate spline algorithm.

19. The system of claim 16, wherein the processor down-samples the partial 3D model and the partial scan before deforming the partial 3D model to at least partially match the partial scan.

20. The system of claim 15, wherein the processor refines the deformed 3D model using the deformation graph by:

uniformly down-sampling the whole 3D model; and building the deformation graph based upon the down-sampled whole 3D model.

21. The system of claim 20, wherein the processor builds the deformation graph by:

generating one or more deformation nodes for each point in the down-sampled whole 3D model;

initializing a 3D position of the one or more deformation nodes using a 3D position of a corresponding point in the down-sampled whole 3D model;

searching neighboring deformation nodes for the one or more deformation nodes within a predetermined distance; and initializing a 3D affine matrix and a translation vector for the one or more deformation nodes based upon the searched neighboring deformation nodes; and assigning, to the deformation graph, a list of the generated deformation nodes, the 3D position of the one or more deformation nodes, the 3D affine matrix of the one or more deformation nodes, and the translation vector of the one or more deformation nodes.

22. The system of claim 21, wherein the processor deforms the one or more deformation nodes of the deformation graph to match at least one point in the partial scan.

23. The system of claim 22, wherein the 3D affine matrix of the one or more deformation nodes is kept as rigid as possible during deforming of the one or more deformation nodes of the deformation graph.

24. The system of claim 22, wherein a first deformation influence of the one or more deformation nodes to one or more of the searched neighboring deformation nodes is kept as similar as possible to a second deformation influence of the one or more of the searched neighboring deformation nodes to the one or more deformation nodes.

25. The system of claim 22, wherein the processor optimizes the deformation graph based upon at least one of rigidity, smoothness, and fit.

26. The system of claim 15, wherein the processor reshapes the refined deformed 3D model to have greater detail by:

identifying for each point in the refined deformed 3D model, one or more neighbor points in the refined deformed 3D model;

determining an average distance between each point in the refined deformed 3D model and the one or more identified neighbor points in the refined deformed 3D model;

identifying, for each point in the refined deformed 3D model, one or more neighbor points in the partial scan;

selecting one or more of the identified neighbor points in the partial scan that are located inside a cylinder region of the partial scan;

determining an average of the selected neighbor points in the partial scan that are located inside the cylinder region of the partial scan; and moving each point in the refined deformed 3D model to the average of the selected neighbor points in the partial scan that are located inside the cylinder region of the partial scan.

27. The system of claim 26, wherein:

a center of the cylinder region of the partial scan is a point in the refined deformed 3D model, an axis of the cylinder region of the partial scan is a normal of the point in the refined deformed 3D model, and a radius of the cylinder region of the partial scan is the average distance between each point in the refined deformed 3D model and the identified one or more neighbor points in the refined deformed 3D model.

28. The system of claim 15, wherein the processor adjusts the refined deformed 3D model according to the reshaped 3D model by deforming one or more points in the refined deformed 3D model to match one or more corresponding points in the reshaped 3D model.

* * * * *